United States Patent [19]

Dilley

[11] 4,181,892
[45] Jan. 1, 1980

[54] SWEEPING NOISE BLANKER

[75] Inventor: Douglas M. Dilley, La Mesa, Calif.

[73] Assignee: The United States of America as represented by the Secretary of the Navy, Washington, D.C.

[21] Appl. No.: 905,304

[22] Filed: May 12, 1978

[51] Int. Cl.² .................. H04B 1/10; H04B 15/00
[52] U.S. Cl. ............................ 325/474; 325/435; 325/479; 328/165
[58] Field of Search .............. 325/432, 435, 473–477, 325/334, 335, 363, 479; 328/165, 167, 163; 324/57 N, 57 SS, 77 B, 77 C, 77 CS

[56] References Cited

U.S. PATENT DOCUMENTS

| 3,387,222 | 6/1968 | Hellwarth et al. | 325/474 |
| 3,611,145 | 10/1971 | O'Connor | 325/474 |
| 3,651,406 | 3/1972 | Mohr et al. | 325/475 |
| 3,868,577 | 2/1975 | Watt | 325/476 |

Primary Examiner—Robert L. Griffin
Assistant Examiner—Jin F. Ng
Attorney, Agent, or Firm—R. S. Sciascia; G. J. Rubens; H. Fendelman

[57] ABSTRACT

A noise rejection circuit for a communications receiver in which the input to the receiver is continually sampled by a sweeping heterodyne oscillator to develop a difference frequency noise signal which represents the input noise over a wide frequency band. The receiver input is also processed by a conventional heterodyne oscillator to develop an output at an intermediate frequency that is comprised of the desired signal plus the noise component. Further processing of both the swept heterodyne oscillator and the normal heterodyne oscillator outputs in a differential combiner serves to remove the noise from the desired data signal.

8 Claims, 1 Drawing Figure

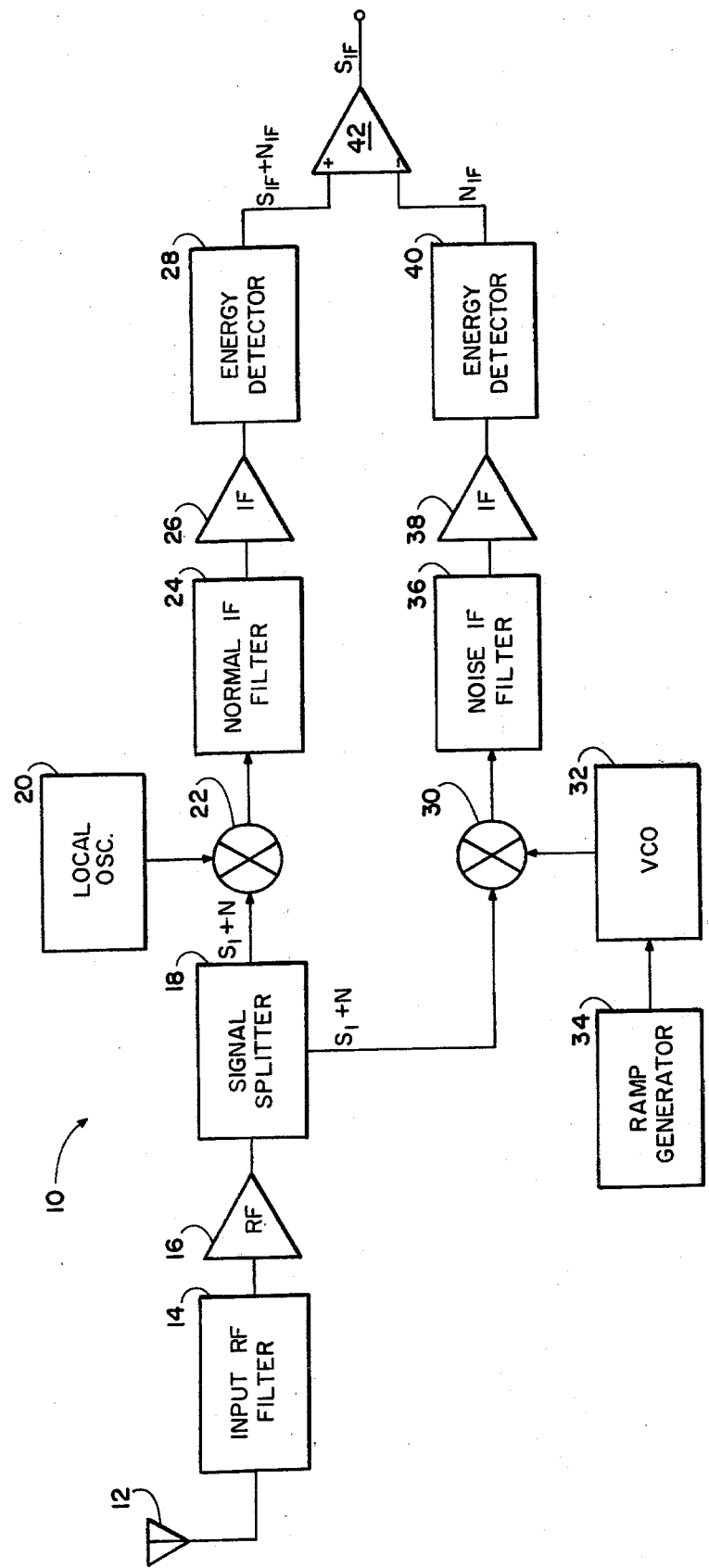

SWEEPING NOISE BLANKER

BACKGROUND OF THE INVENTION

A communications receiver used at high frequencies (HF) is subject to interference from atmospheric noise, lightning and other naturally occurring background noise as well as man-made electrical noise. This noise adversely affects reception in this portion of the RF spectrum and limits the effective range of communication. Receivers can be designed capable of detecting signals far below the level of this noise but the ever present noise must be removed or suppressed in order to benefit from these designs. Therefore, modern HF receivers typically employ some sort of noise suppression or processing circuitry.

The noise processors in common use today generally are non-linear devices and typically are implemented as limiters or clippers. These processors are quite rudimentary and usually attenuate the desired signals as well as the noise. Another processor in limited use is the Lamb noise blanker. This is also a threshold device but it is a feed forward scheme which detects noise peaks above the threshold and uses the detected signal to shut down the stage following the noise detector for the duration of the noise impulse. The Lamb noise blanker has the disadvantages that it must be placed in the circuit where signal levels are very low and dynamic range so small that it is only useful on high energy noise impulses. Therefore the signal-to-noise improvement varies directly with signal level.

SUMMARY OF THE INVENTION

The present invention relates to an electronic device to be used in a communications receiver to reduce receiver response to wide band noise. This is accomplished in accordance with the present teachings by incorporating a separate feed-forward noise IF channel which uses whitening techniques to reject the narrow band signal. The noise channel signal is then subtracted from the normal IF signal leaving a clean narrow band signal.

The noise elimination technique disclosed herein does not depend upon a thresholding device to separate the noise from the signal. Instead it uses the wide band nature of noise to distinguish it from the desired, narrow band signal. This is accomplished by spectral energy sampling. The receiver input is continually sampled by a sweeping heterodyne oscillator and the energy at the difference frequency is amplified by a noise IF amplifier and energy detected. The output of the energy detector is then subtracted from the normal IF channel heterodyner and energy detector output by a differential combiner to result in the elimination of noise from the signal. Essentially then, the present invention processes the receiver input signal through two separate channels. The normal channel processes the receiver input signal which is comprised of the desired signal plus the noise signal down to an IF level. The noise channel also processes the receiver input signal down to an IF level while simultaneously eliminating the desired signal component from the noise component, by whitening, to result in a noise channel output signal that is comprised substantially entirely of the noise component. This noise component is then subtracted from the noise plus signal components in the normal processing channel whereby the output of the sweeping noise blanker disclosed herein is comprised substantially entirely of the desired signal component free of noise.

OBJECTS OF THE INVENTION

Accordingly, it is the primary object of the present invention to disclose a noise blanker circuit that utilizes whitening techniques to eliminate the noise.

Another object of the present invention is to disclose a noise blanking circuit that is essentially linear.

A further object of the present invention is to disclose a novel noise rejection circuit that processes out the noise both above and below the level of the desired signal.

A still further object of the present invention is to disclose a novel noise blanker that utilizes a feed forward network.

The present invention has the further object to disclose a device that allows for the separation of the narrow band desired signal from wide band noise responses without the use of a threshold device.

Other objects, advantages and novel features of the invention will become apparent from the following detailed description of the invention when considered in conjunction with the accompanying drawings.

BRIEF DESCRIPTION OF THE DRAWINGS

The sole FIGURE is a network block diagram of the sweeping noise blanker in accordance with the present invention.

DESCRIPTION OF THE PREFERRED EMBODIMENT

A block diagram of the sweeping noise blanker 10 of the present invention is illustrated in the FIGURE. Referring thereto it is seen that the input signal from the receiver antenna 12 is filtered at input RF filter 14 to remove RF images. The filter 14 output is amplified at RF amplifier 16 and the resulting signal is split into two isolated channels by signal splitter 18.

Local oscillator 20 and normal mixer 22 comprise the normal heterodyner which operates in conventional fashion. The output of the mixer 22 is furnished to normal IF filter 24. The IF output of filter 24 is amplified by IF amplifier 26 which provides the input to energy detector 28 to be described below.

The second output of signal splitter 18 is fed to the noise mixer 30. Here it is heterodyned with the noise channel voltage controlled oscillator (VCO) 32 which is in turn driven by a ramp generator 34. The ramp generator 34 has a ramp repetition rate that is larger than the half bandwidth of the noise IF filter 36 at the output of noise mixer 30 and a ramp amplitude sufficient to sweep the VCO 32 over a frequency range larger than the bandwidth of the RF input filter 14. The output of the noise IF filter 36 is input to the noise IF amplifier 38, the output of which is in turn input to energy detector 40. Energy detectors 28 and 40 eradicate any phase differential between the IF outputs of amplifiers 26 and 38 and may comprise any of the well known designs such as, for example, a series diode with a shunt capacitor and parallel resistor.

The outputs of the energy detectors 28 and 40 are thus energy detected and are subsequently combined in the differential amplifier 42 where the noise channel signal is subtracted from the normal channel signal.

The operation of the sweeping noise blanker 10 thus far described is as follows. Assuming that the input filter 14 bandwidth is much larger than the bandwidth of either IF filter 24 or 36 and that the IF filters 24 and 36 are substantially identical, a signal with noise will now be traced through this portion of the receiver. Identical signals are presented to both the normal and the noise mixers 22 and 30, respectively. These signals are denoted $S_d$ and N where $S_d$ is the desired signal component of the input and N is the noise component of the input signal. The normal mixer 22 translates the desired signal $S_d$ to the IF and passes it and as much noise as will pass through the normal IF filter 24 to the normal IF amplifier 26.

The noise mixer 30, however, is swept across the entire input filter 14 bandwidth. Since the noise occupies all portions of the input filter 14 bandwidth, the noise is translated to the noise IF throughout the sweep cycle. The energy of the desired signal $S_d$ is translated to the normal IF only during the short interval while the convolution of the signal bandwidth and the IF bandwidth has a finite value. The noise mixer 30 with its swept oscillator input thus tends to whiten the narrow band signal $S_d$ or, stated another way, spreads the signal $S_d$ out over a frequency band equal to the input filter bandwidth. The energy of the signal $S_d$ which reaches the noise IF amplifier 38 is thus reduced by a factor approximately the same as the ratio of the IF to the input filter 14 bandwidth. In this way the desired signal $S_d$ is substantially entirely removed in the noise channel from the noise component N. The noise channel thus affords a high degree of rejection for the desired signal while allowing all of the wide band noise N to pass through to the noise amplifier 38. The fact that there is a finite difference in time of arrival at the noise IF filter 36 of different spectral samples is of no consequence so long as the sweep rate is large with respect to the half bandwidth of the noise IF filter 36.

As described above the energy detectors 28 and 40 eradicate any phase differential between the output of the amplifiers 26 and 38. The signals present at the input to differential combiner 42 are denoted as $S_{IF}+N_{IF}$ and $N_{IF}$. $S_{IF}$ represents the desired signal component at the IF and $N_{IF}$ is the noise component at the IF. It is readily apparent therefore that at the non-inverting input of the differential amplifier 42 there appears the signal plus the noise, both at the IF. At the inverting input to the differential amplifier 42 only the noise component $N_{IF}$ appears plus a small gaussian component due to the whitened desired signal. At the differential amplifier 42 then, the IF noise, $N_{IF}$, is subtracted from the signal, $S_{IF}$, plus noise, $N_{IF}$, leaving the desired signal, $S_{IF}$, only.

The sweeping noise blanker 10 as disclosed herein has the advantage of being a linear device. It is therefore, not subject to the small dynamic range in limited application of thresholding devices such as clippers and the Lamb noise blanker. Further, it is not limited to the reduction of impulse noise but may be applied to any wide band interference satisfying the criteria of having a shorter rise time than the receiver input network. The device disclosed herein is, moreover, particularly suitable for processing noise below the level of the signal in addition to which its use is not restricted to high energy impulse noise but may be applied to any wide band noise problem. It is understood that the sole FIGURE and description thereof consider only those aspects of the receiver pertinent to the operation of the noise blanker 10 and that in an actual communications receiver, the input filter 14 would be ganged to track the local oscillator 20. Additionally, the center frequency of the VCO 32 would also track the local oscillator 20. It is to be understood further that the noise IF filter 36 and the normal IF filter 24 need not be identical although if they have the same center frequency, same bandwidth and the same number of resonators, the simplest configuration is believed to be achieved.

Obviously many modifications and variations of the present invention are possible in the light of the above teachings. It is therefore to be understood that within the scope of the appended claims the invention may be practiced otherwise than as specifically described.

What is claimed is:

1. A noise reduction network comprising:
   first means for receiving an input signal having an input noise component and an input desired signal component and for providing an output signal comprised of an output noise component and an output desired signal component;
   second means comprising a swept heterodyne oscillator connected to said first means for substantially removing said output desired signal component from said first means output signal and for providing an output that is substantially entirely said output noise component; and
   third means operably connected to said first and second means for combining said second means output with said first means output noise component and said first means output desired signal component and for outputting a third means output signal comprised substantially entirely of said first means output desired signal component.

2. The noise reduction network of claim 1 wherein said second means comprises:
   a mixer connected to said first means;
   a voltage controlled oscillator connected to said mixer; and
   a ramp generator connected to said voltage controlled oscillator.

3. The noise reduction network of claim 1 wherein said first means comprises:
   an antenna for receiving said input signal;
   a radio frequency filter connected to said antenna; and
   a signal splitter connected to said radio frequency filter and to said second means.

4. The noise reduction network of claim 3 wherein said first means further comprises:
   means connected to said signal splitter for reducing the frequency of the output thereof to an intermediate frequency.

5. The noise reduction network of claim 4 wherein said reducing means comprises:
   a mixer connected to said signal splitter;
   a local oscillator connected to said mixer;
   an intermediate frequency filter connected to said mixer; and
   an amplifier connected to said intermediate frequency filter.

6. The noise reduction network of claim 5 wherein said swept heterodyne oscillator comprises:
   a mixer connected to said signal splitter;
   a voltage controlled oscillator connected to said mixer; and
   a ramp function generator connected to said voltage controlled oscillator.

7. The noise reduction network of claim 6 wherein said third means comprises a differential combiner.

8. The noise reduction network of claim 7 wherein said third means further comprises an energy detector means connected to the outputs of said first and second means and to the input of said differential combiner for eliminating any phase difference between said outputs of said first and second means.

* * * * *